United States Patent [19]
Johnston

[11] Patent Number: 5,058,536
[45] Date of Patent: Oct. 22, 1991

[54] VARIABLE-CYCLE RECIPROCATING INTERNAL COMBUSTION ENGINE

[76] Inventor: Richard P. Johnston, 3044 Middleboro Rd., Morrow, Ohio 45152

[21] Appl. No.: 380,560

[22] Filed: Jul. 13, 1989

Related U.S. Application Data

[63] Continuation of Ser. No. 148,286, Jan. 29, 1988, Pat. No. 4,856,463, which is a continuation-in-part of Ser. No. 7,951, Jan. 28, 1987, abandoned.

[51] Int. Cl.⁵ .................................................. F02B 25/08
[52] U.S. Cl. ................................... 123/51 BA; 60/611
[58] Field of Search ........... 60/602; 123/48 B, 51 BA, 123/323

[56] References Cited

U.S. PATENT DOCUMENTS

| | | |
|---|---|---|
| 2,037,051 | 4/1936 | Smiley . |
| 2,137,941 | 11/1938 | Helmore et al. . |
| 2,401,188 | 5/1946 | Prince .................. 123/51 BA |
| 2,412,365 | 12/1946 | Sollinger ................ 60/602 X |
| 2,840,060 | 6/1958 | Johansson . |
| 2,858,816 | 11/1958 | Prentice ................ 123/51 BA |
| 2,906,143 | 9/1959 | Musser . |
| 3,006,215 | 10/1961 | Musser . |
| 4,093,046 | 6/1978 | Perr ..................... 123/323 X |
| 4,286,476 | 9/1981 | Stiff . |
| 4,312,306 | 1/1982 | Bundrick, Jr. . |
| 4,419,969 | 12/1983 | Bundrick, Jr. . |

FOREIGN PATENT DOCUMENTS

| | | |
|---|---|---|
| 616451 | 7/1935 | Fed. Rep. of Germany ........ 123/51 BA |
| 1153208 | 8/1963 | Fed. Rep. of Germany ...... 123/323 |
| 3529761 | 2/1987 | Fed. Rep. of Germany ...... 123/323 |
| 346835 | 12/1904 | France ............................ 123/323 |
| 533941 | 12/1921 | France . |
| 2285514 | 4/1976 | France ............................ 60/602 |
| 111004 | 8/1979 | Japan .......................... 123/51 BA |
| 440286 | 12/1935 | United Kingdom ............ 60/602 |
| 2080923 | 2/1982 | United Kingdom . |

*Primary Examiner*—Michael Koczo
*Attorney, Agent, or Firm*—Frost & Jacobs

[57] ABSTRACT

An internal combustion engine having a pair of opposed pistons in a block has a piston connected to a respective crankshaft. A gear train synchronizes the speed and relative angular relationship between the crankshafts. A timing actuator, connected to and engaged with either of the crankshafts, permits continuous selective adjustment of the headspace between the pistons by varying parameters such as intake and exhaust port timing and air flow through the cylinder.

2 Claims, 11 Drawing Sheets

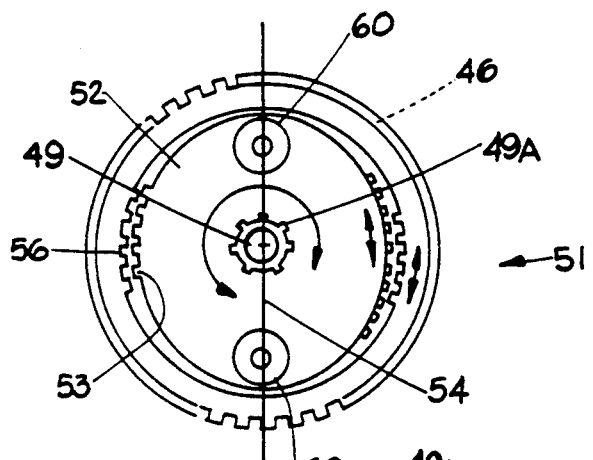
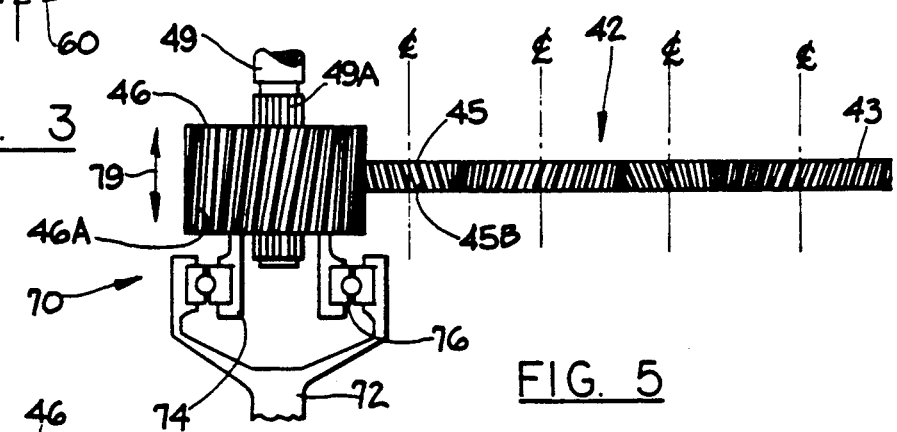
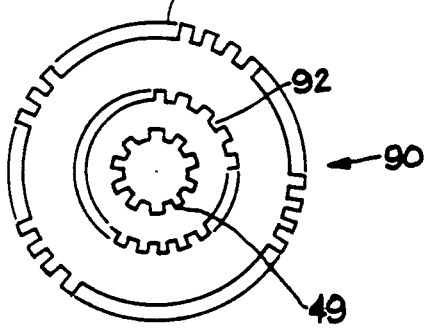
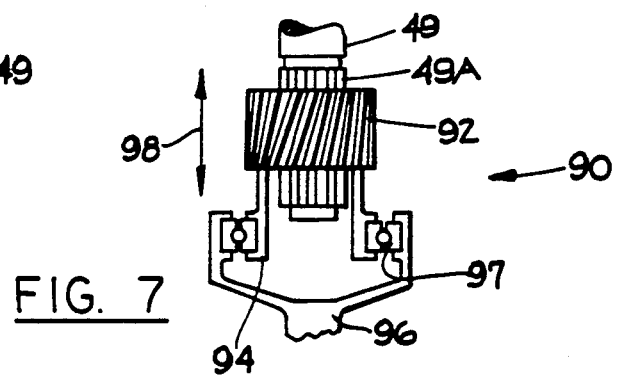

VARIABLE-CYCLE RECIPROCATING INTERNAL COMBUSTION ENGINE

This is a continuation of U.S. application Ser. No. 07/148,286, filed Jan. 29, 1988, now U.S. Pat. No. 4,856,463, which is a continuation-in-part of U.S. application Ser. No. 07/007,951, filed Jan. 28, 1987, now abandoned.

BACKGROUND OF THE INVENTION

1. Field of the Invention

The present invention is generally related to variable-cycle internal combustion engines, and in particular is concerned with an apparatus to selectively vary intake air flows and pressures, exhaust gas back pressure and flows, and the phase relationship of a pair of crankshafts, thereby selectively varying the timing and compression ratio of a double crankshaft opposed-piston engine to enhance engine efficiency and increase engine power under design and off-design conditions.

2. Description of the Related Art

Generally, many of the cycle operating parameters of an internal combustion engine are fixed at the time of manufacture. These parameters are often set by the fixed geometry of the engine or the timing relationships between various mechanisms, such as valve timing, ignition timing or fuel injection schedules. These relationships and values are often selected to allow reasonably good operation over the engine's full range of power and speed but are never optimum at any of the operating points. Other engines have their relationships selected to favor just one or two narrow operating regimes, but then are seriously deficient at the other operating design points. For example, engine compression ratio and intake/exhaust port timing are generally fixed by the engine's geometry and the actuating assemblies. As the engine operates throughout its entire range, firing temperatures, peak cylinder pressures and scavenging levels may never simultaneously be at their optimum relative levels.

An engine designed for maximum power levels may not operate efficiently at lower speeds. Parameters such as peak cylinder temperatures and pressures at a maximum power level or port scavenging at high operating speeds can result in a compression ratio and port timing that is inefficient and inappropriate at lower power and speed settings.

The Junker engine was developed and used as an aircraft engine in Germany early in the twentieth century. The engines included pairs of opposed pistons mounted in multiple cylinders and controlled by a pair of synchronized gear crankshafts. A detailed description of the Junker engine is found at Chapter X of *Aircraft Diesels* by Paul H. Wilkinson (Pitman Publishing Corp., N.Y., N.Y.).

U.S. Pat. No. 2,401,188, which issued to Prince in 1946, shows an internal combustion engine having a variable compression ratio. A pair of sprockets are secured to respective piston drive shafts in an opposed piston internal combustion engine. A loose chain is wrapped around and connects the sprockets. A frame selectively takes up the slack of the top or bottom chain element to vary the phase relationship of the crankshafts to achieve a change in compression ratio.

U.S. Pat. Nos. 4,312,306 and 4,419,969, issued to Bundrick, Jr., show an internal combustion engine having a pair of opposed pistons connected to cranks of unequal throws. The pistons are adjustable in opposing linear travel to define a flexible cylinder head.

Consequently, a need exists for improvements in internal combustion engines. It is desirable that an engine eliminate the restrictions of fixed geometry and consequential inefficient cycle operating parameters as the engine moves through its entire range of operation. It is also desirable for an engine to permit continued adjustment of cycle operating parameters while running for the most efficient operation possible without exceeding mechanical design limits. It is also desirable for the intake and exhaust conditions to be simultaneously controlled so that parasitic power losses are reduced and cylinder air charges are densified as needed. It is also desirable that intake/exhaust power extraction systems be applied effectively and the engine geometry changes be coordinated with intake/exhaust changes.

SUMMARY OF THE INVENTION

The present invention includes an internal combustion engine that permits simultaneous adjustment of engine geometry, intake and exhaust flow and pressure, and critical engine cycle operating conditions to achieve optimum thermodynamic efficiency throughout the engine's operating range. The present engine permits simultaneous variation of compression ratios, fuel injection timing, intake and exhaust port timing, cylinder air charge density and mass, scavenge air throughflow rates, and control of inlet air flow and pressure and exhaust gas back pressure and flow to achieve optimum values without exceeding engine mechanical load limits.

In a preferred embodiment, the present invention includes an internal combustion engine having a pair of opposed pistons in a block. Each piston is connected to a respective crankshaft. A gear train synchronizes the speed and relative angular relationship between the crankshafts. A timing actuator, connected to and engaged with the gear train, permits continuous selective adjustment of the headspace between the pistons and varies parameters, such as intake and exhaust port timing and air flow through the cylinder.

In accordance with other aspects of the invention, certain design features are incorporated that enable the engine to utilize the improved thermodynamic cycle possible in a variable cycle engine. These features include an intake air swirler to induce high levels of turbulence in the combustion chamber of the cylinder, an exhaust collector to insulate the exhaust section of the block from the hot exhaust stream and an impingement cooled cylinder liner to conduct away the increased amount of heat produced in a high specific power variable cycle engine. Furthermore, the present invention teaches the use of an improved hybrid piston, and flow restricting plugs and variable air turbines to control air flow and pressure.

BRIEF DESCRIPTION OF THE DRAWINGS

Other features and advantages of the present invention will become more fully apparent from the following detailed description of the preferred embodiment, the appended claims and the accompanying drawings in which:

FIG. 3 is a schematic view of a harmonic gear drive assembly for use with the engine of FIGS. 1 & 2;

FIG. 5 is a top plan view of an alternate timing actuator for use with the engine of FIGS. 1 & 2;

FIG. 6 is an end view of a second alternate timing actuator for use with the engine of FIGS. 1 & 2;

FIG. 7 is a top view of the alternate timing change actuator of FIG. 6, wherein the first gear member has been removed for clarity of illustration;

Reference will now be made in detail to the present preferred embodiment of the invention, an example of which is illustrated in the accompanying drawings.

DETAILED DESCRIPTION OF THE PREFERRED EMBODIMENTS

Figure 1:
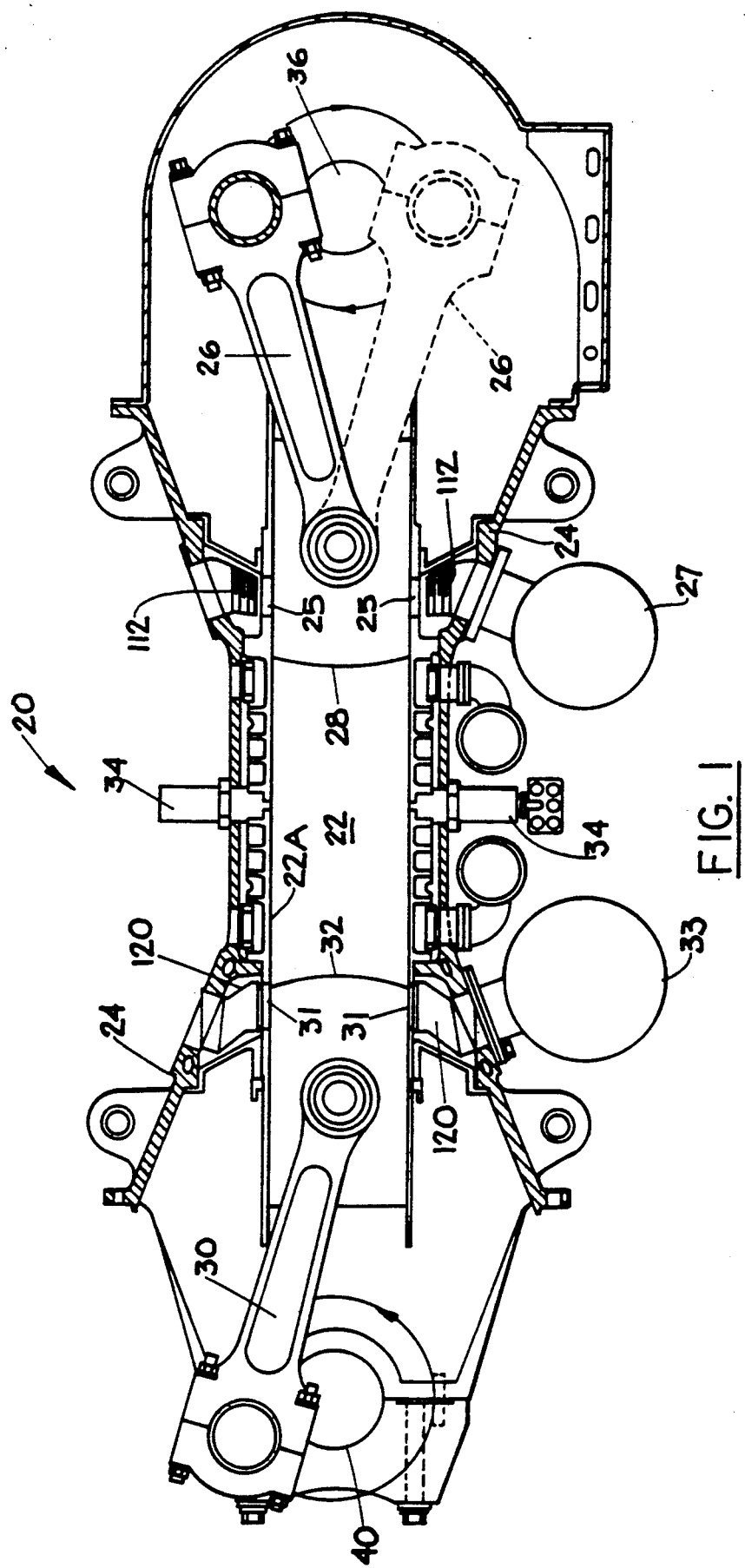
FIG. 1 is a partial sectional side view of an internal combustion engine of the present invention.

An internal combustion engine of the present invention, indicated generally at 20, is illustrated in FIG. 1. A cylinder chamber 22 defined by cylinder walls 22A is provided in a block 24 in a well-known manner. A connecting rod 26 is pivotally connected at its first end to a first or intake piston 28 for driving the piston 28 in the cylinder 22. Rod 26 is connected at its second end to crankshaft 36. A connecting rod 30 is pivotally connected at its first end to a second or exhaust piston 32 for driving the piston 32 in the cylinder 22. Rod 30 is connected at its second end to crankshaft 40. Fuel injectors 34 are provided to supply combustible fuel to the cylinder 22 in a well known manner.

As intake piston 28 is reciprocated to the right in FIG. 1, inlet ports 25 are uncovered so that incoming air from the intake manifold 27 flows into the cylinder 22. As exhaust piston 32 is reciprocated to the left in FIG. 1, exhaust ports 31 are uncovered so that exhaust gases in the cylinder 22 escape through the exhaust manifold 33.

Figure 2:
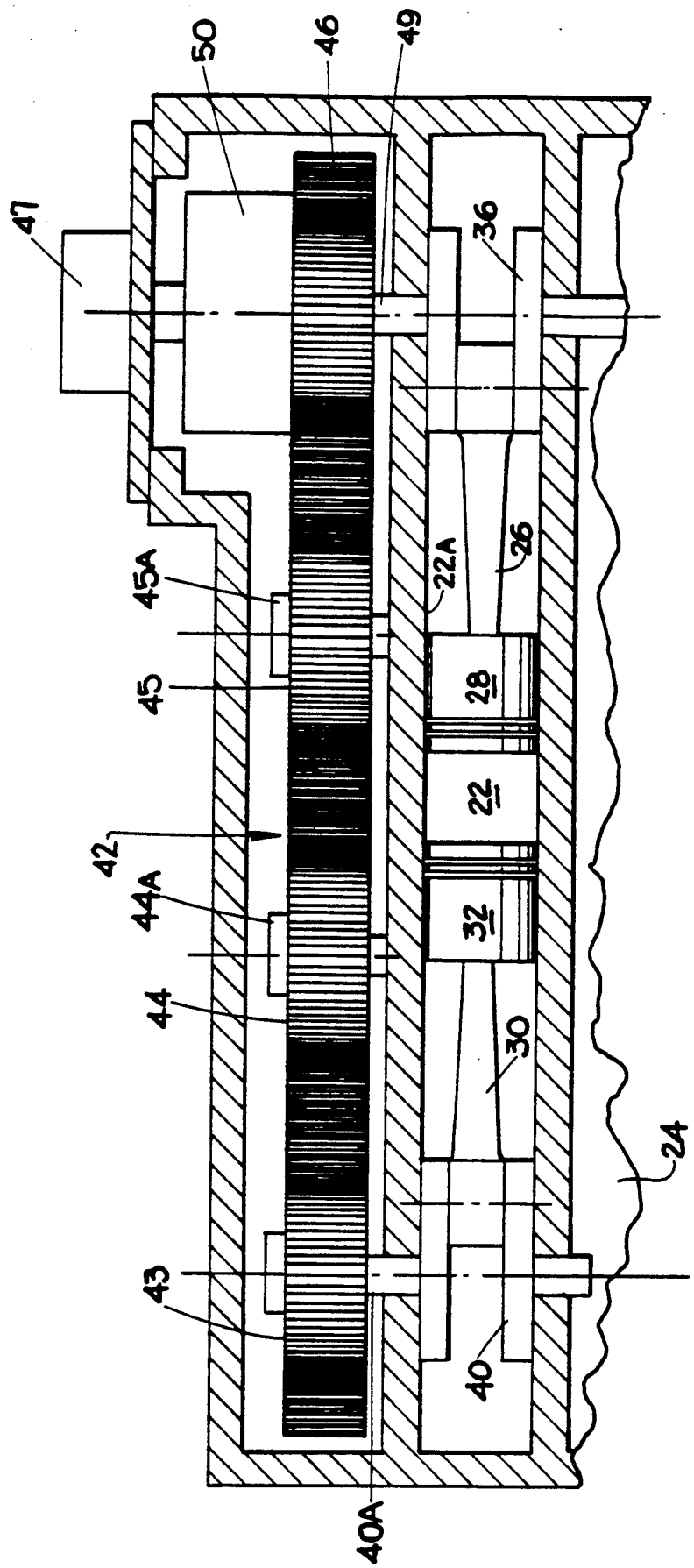
FIG. 2 is a partial top plan view of an internal combustion engine of the present invention.

As illustrated in FIG. 2, a gear train 42 synchronizes the rotation and relative angular relationship between the intake piston crankshaft 36 and the exhaust piston crankshaft 40. For purposes of illustration only, the embodiment of the gear train 42 of FIG. 2 includes four gear members 43, 44, 45 and 46. Crankshaft 36 includes an extension 49 which is mated with gear member 46. In a similar manner, crankshaft 40 includes an extension 40A which is mated to gear member 43. Gear members 44 and 45 are mounted upon respective support shafts 44A and 45A. An engine output shaft (not shown) is driven by the gear train 42 and can be connected to the gear train 42 in any suitable manner. Other gear train configurations are within the scope of the present invention. Synchronization of the crankshafts 36 and 40 directly controls the reciprocating motion of pistons 28 and 32 in the cylinder chamber 22.

In conventional engines, timing between crankshafts 36 and 40 is fixed at a selected value at manufacture. In the present engine 20, timing between crankshafts 36 and 40 can be selectively and continuously varied during operation of the engine by a timing actuator 50. As illustrated in FIG. 2 and described below, actuator 50 cooperates with crankshaft extension 49 and gear 46. A control input 47 operates the actuator 50 to selectively change the rotational and angular phase relationship of gear member 46 with respect to gear member 43. This change in phase relationship varies the headspace between pistons 28 and 32 and results in variable timing of the opening and closing of the intake ports 25 and exhaust ports 31. It will be understood that actuator 50 can also be adapted for use with gear member 43, if desired.

The function of the actuator 50 can be successfully accomplished in many modes. One acceptable method is to use a harmonic gear drive assembly as the timing actuator. Harmonic gear drives are generally well known in the art, consisting of a rigid member with gear teeth which mesh with gear teeth disposed on a flexible member. The flexible member has fewer gear teeth than the right member, and is caused to mesh with the rigid member by a wave generator. Rotation of the wave generator with respect to the flexible member causes a rotation of the flexible member with respect to the rigid member. As used in the specification and claims the term "harmonic gear drive assembly" defines a structure as described above.

A first preferred embodiment of the timing actuator 50 schematically illustrated in FIG. 3. A harmonic gear drive assembly indicated generally at 51 includes a flexible, oval gear 52 having a plurality of spline teeth 53 about its outer circumference and an input wave generator 54. Oval gear 52 is mounted on splines 49A of crankshaft extension 49. Spline teeth 53 are engaged with inner teeth 56 of gear member 46. Bearing assembly 60 connects the wave generator 54 to the oval gear 52. The number of spline teeth 53 is less than the number of inner teeth 56 on gear member 46. Control input 47 imparts rotation to the wave generator 54. During rotation, spline teeth 53 disengage, advance and reengage with teeth 56. Such tooth interaction produces an angular phase change between gear members 46 and 43 and crankshafts 36 and 40. The number of spline teeth 53 is dependent upon the desired wave generation. A harmonic gear drive assembly of the type described above is disclosed in U.S. Pat. No. 2,906,143, which is hereby incorporated by reference.

Figure 4:
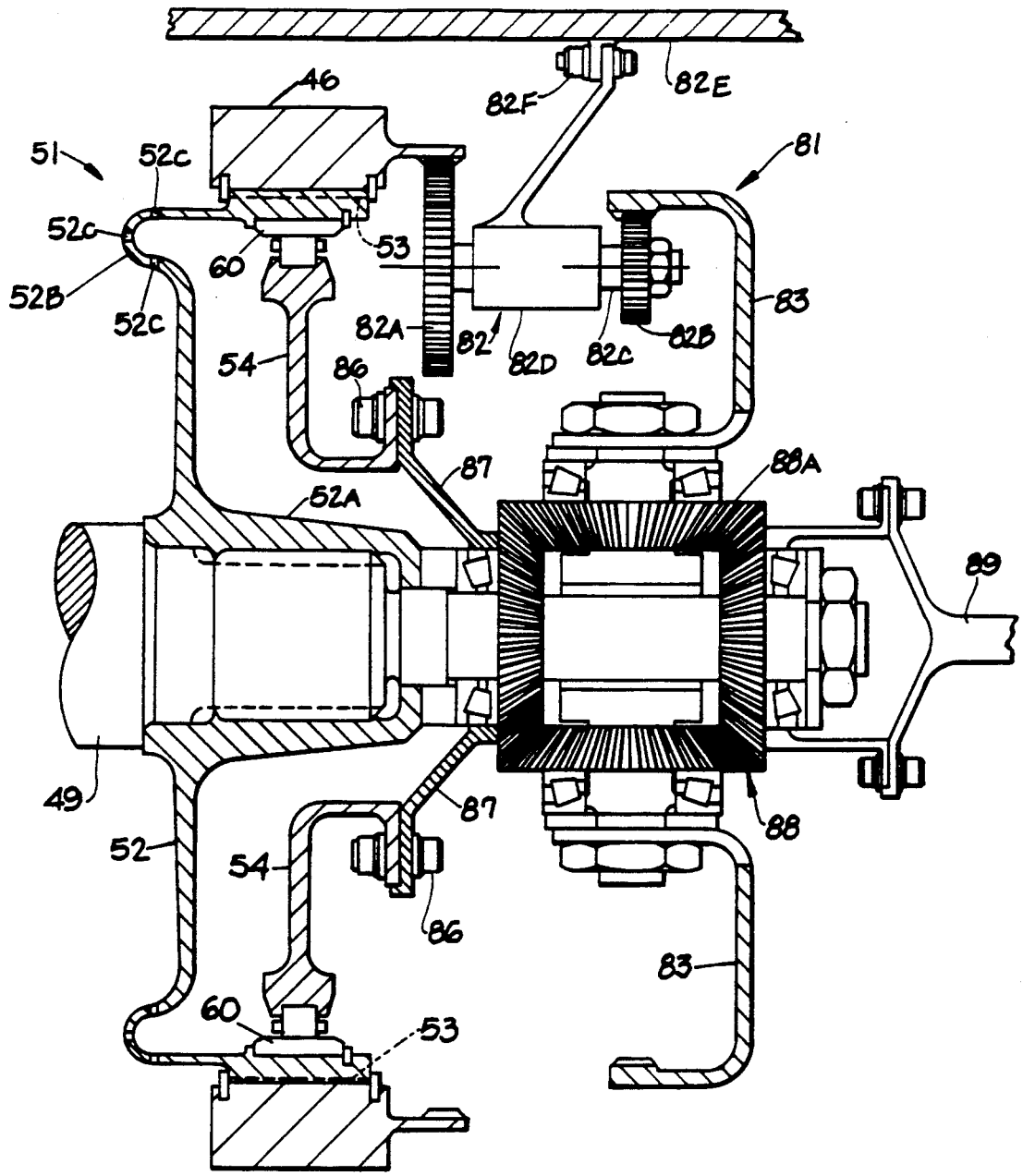
FIG. 4 is a top plan view of an embodiment of the assembly of FIG. 3.

A top plan pictorial representation of a harmonic gear drive assembly 51 is illustrated in FIG. 4. Oval gear 52 includes a central flanged portion 52A having internal splines (not shown) which mate with splines 49A (not shown) of crankshaft extension 49. An outer elbow portion 52B terminates in spline teeth 53, as described above. The wave generator 54 is connected to an elbow portion 52B of oval gear 52 by bearing assembly 60. It is desirable to provide radial slots, indicated at 52C, in the elbow portion 52B to reduce radial forces during wave generation. A gear extension 87 is connected to a conventional gear differential 88 in any suitable manner. The gear extension 87 is also connected to the wave generator 54 by fasteners 86.

A means is provided for clocking the rotation of gear member 46 to the spider 88A of the gear differential 88. A clocking assembly 81 includes a gear reducer 82 and a clocking member 83. In a preferred embodiment, the gear reducer 82 includes a first gear member 82A and a second gear member 82B interconnected by shaft 82C. Shaft 82C is supported by bearing 82D which is secured to a stationary point 82E by fasteners 82F. Gear member 46 is mated to gear member 82A. Gear member 82B is mated to clocking member 83. For example, a one-half reduction in rotational speed from gear member 46 to clocking member 83 can be performed by reducer 82. Other clocking configurations are within the scope of the present invention.

A selected control input motion is supplied through shaft 89 to the gear differential 88 to create the desired rotation of the wave generator 54. As described above, the disengaging, advancing and reengaging of spline teeth 53 causes a change in the phase relationship between crankshaft extension 49 and gear member 46.

A second preferred embodiment of a timing actuator 50 is indicated generally at 70 in FIG. 5. Gear member 46 is engaged with and slidably mounted on the splines 49A of crankshaft extension 49. Outer gear teeth/splines 46A of gear member 46 are mated with splines 45B of gear member 45. The pitch of splines 46A are at a selected angular differential to the splines of 45B. An outer yoke 72 is connected to inner yoke 74 through bearing 76. The inner yoke 74 is connected to gear member 46 in any selected manner. The inner yoke 74 rotates with gear member 46. Outer yoke 72 is actuated linearly parallel to shaft extension 49 in the directions of arrow 79. The linear actuation of yoke 72 is transmitted by bearing 76 and yoke 74 to gear member 46. As gear member 46 slides along the splines 49A of crankshaft extension 49, the tooth angle differential provides relative rotation between the crankshaft extension 49 and the remainder of the gear train 42. As stated above, this relative rotation results in an angular phase change between crankshafts 36 and 40.

A third preferred embodiment, indicated generally at 90, of a timing actuator 50 is illustrated in FIGS. 6 & 7. A gear insert 92 is slideably engaged with the crankshaft extension 49 and the axially-fixed gear member 46 (removed for clarity of illustration in FIG. 7). A selected differential is provided between the gear insert splines 92 and the shaft extension splines 49A. An inner yoke 94 is connected to gear insert 92 in any suitable manner. Outer yoke 96 is connected to inner yoke 94 by bearing 97. Outer yoke 96 is actuated in the directions of arrow 98 to produce movement of gear insert 92. A change in position of gear insert 92 relative to gear member 46 provides selected change in the angular phase relationship between crankshafts 36 and 40.

Figure 8:
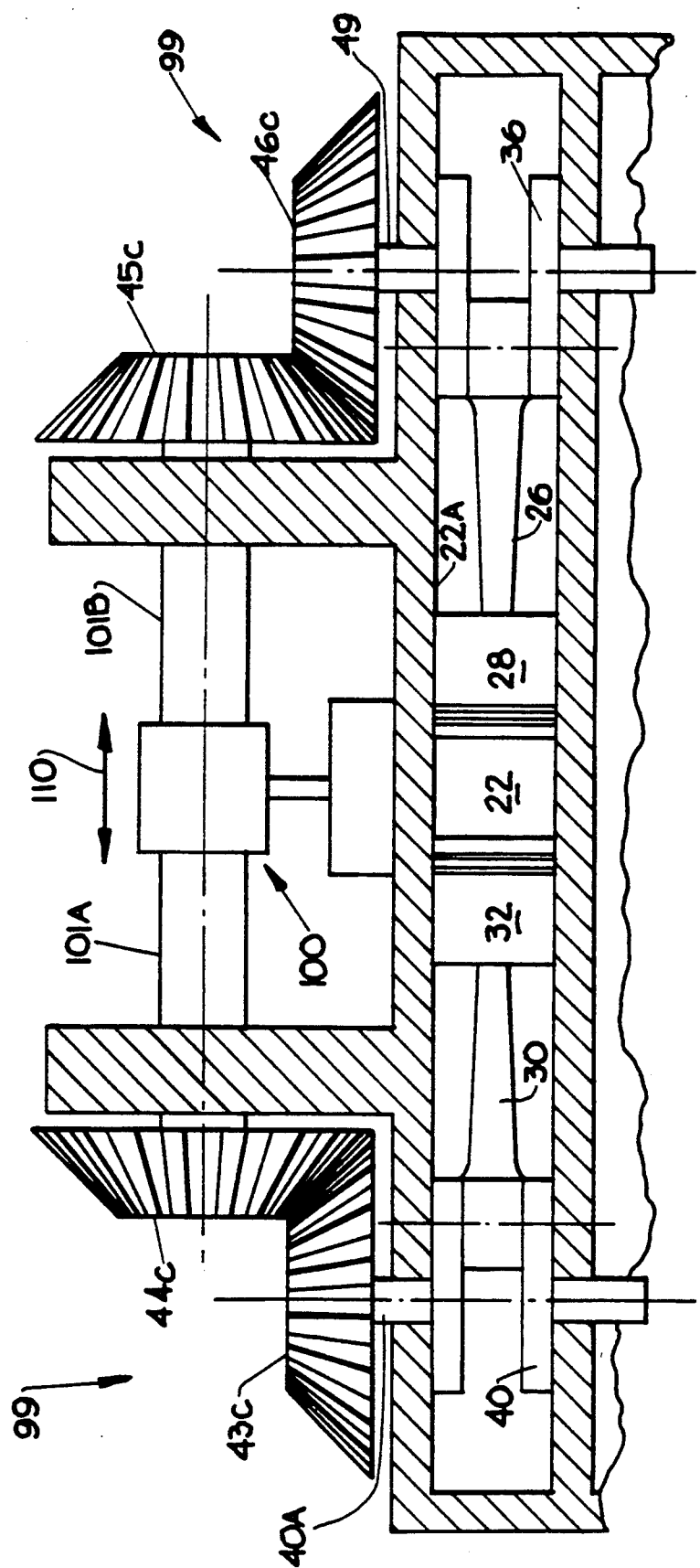
FIG. 8 is a partial top plan view of an alternate gear train and timing actuator for use with an engine of the present invention.

In FIG. 8, an alternative gear train 99 is utilized to synchronize the angular relationship between crankshafts 36 and 40. In gear train 99, each of the gear members 43C, 44C, 45C and 46C are bevel gears. Gear members 43C and 44C are perpendicularly mated and gear members 45C and 46C are perpendicularly mated. Transfer shafts 101A and 101B are connected to gears 44C and 45C, respectively.

Figure 9:
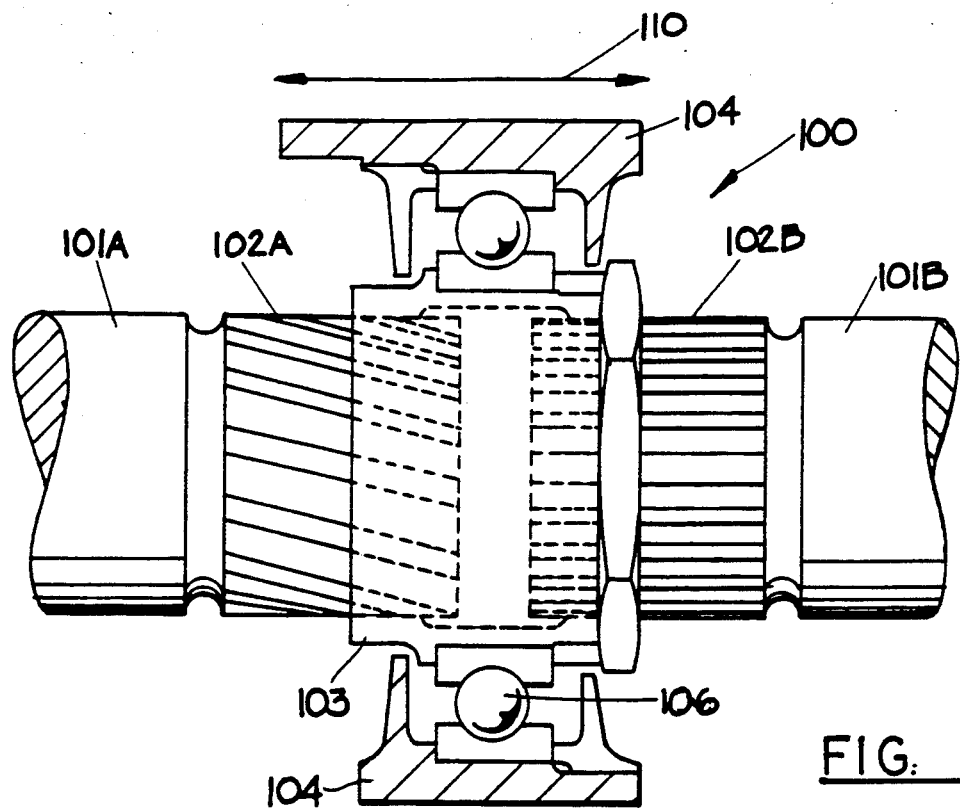
FIG. 9 is a detailed sectional view of the timing actuator of FIG. 8.

A fourth preferred embodiment of a timing actuator 50, indicated generally at 100, is utilized with the gear train 99 illustrated in FIGS. 8 and 9. As shown only in FIG. 9, each shaft 101A and 101B terminates in a splined portion 102A and 102B, respectively, of different angular pitch with respect to one another. For example, splines 102A are beveled while splines 102B are straight. Other spline configurations are within the scope of the present invention. A shifter 103 includes an internal spline portion complementary to the beveled splines 102A and an internal spline portion complementary to the straight splines 102B. A yoke 104 is connected to the shifter 103 by bearing 106. As the yoke 104 is moved in either direction of arrow 110, the angular phase relationship between transfer shafts 101A and 101B is selectively varied, thereby varying the phase relationship between crankshafts 36 and 40.

Figure 10:
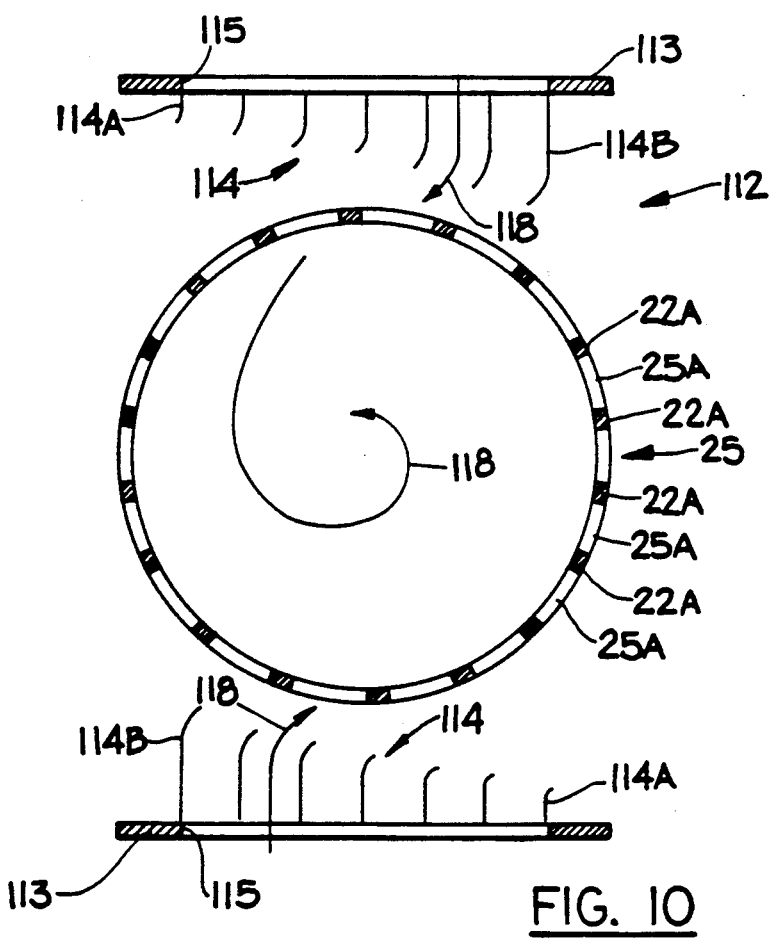
FIG. 10 is a sectional view through an intake air swirler for use with the intake system of the engine of FIGS. 1 & 2.

In operation, air is drawn into the cylinder 22 from the intake manifold 27 (see FIG. 1). To enhance the motion of air in the cylinder 22, an air swirler 112 is provided adjacent each inlet port 25. As illustrated in FIG. 10, a plurality of curved vanes 114 is provided adjacent an opening 115 in the intake duct 113. Each inlet port 25 comprises a plurality of openings 25A in the cylinder wall 22. The vanes 114 are provided on opposite sides of the duct 113 and positioned so that the vanes 114 along one inner surface are curved opposite the vanes 114 on an opposite surface to enhance vortex motion and create a swirling motion in the incoming air, represented by arrows 118. The curvature of the vanes 114 is selected to complement other engine design parameters. It is desirable that the vanes 114 project outwardly in increasing length from the inner surface of the inlet duct 113 so that the leading vane 114A (with respect to the direction of curvature) is closer to the intake duct 113 than the trailing vane 114B. This construction maximizes the nozzle discharge area of the swirler 112.

Figure 11:
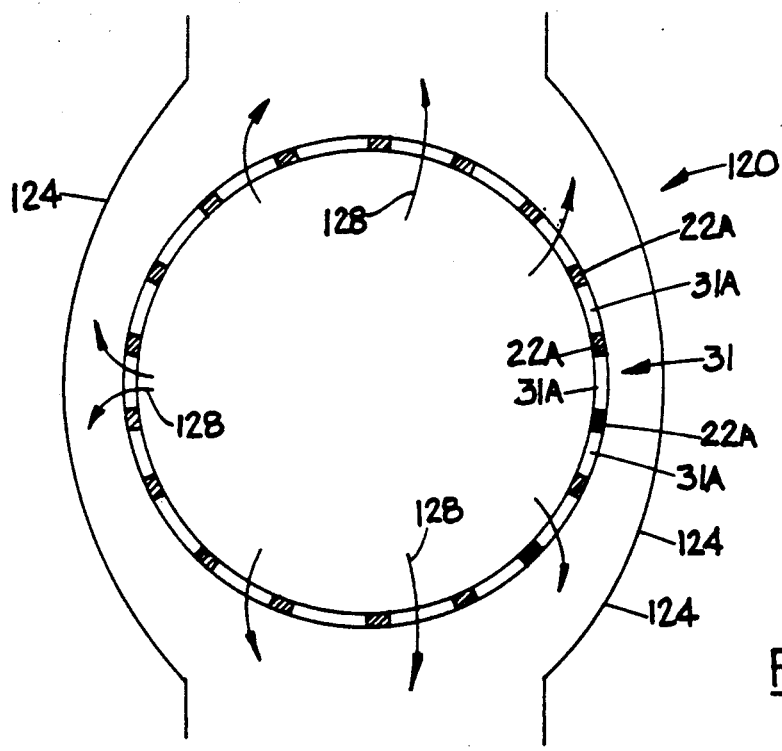
FIG. 11 is a sectional view through an exhaust collector for use with the exhaust system of the engine of FIGS. 1 & 2.

It is also desirable to include means for controlling the exhaust exiting through the exhaust ports 31. An exhaust collector 120 surrounds the exhaust ports 31 in the exhaust portion of cylinder 22. As illustrated best in FIG. 11, each collector 120 includes an outer duct 124 constructed from heat-resistant metal. Each exhaust port 31 comprises a plurality of openings 31A in the cylinder wall. Exhaust gases, represented by arrows 128, exit through the openings 31A. Outer duct 124 guides the hot exhaust gases to the exhaust manifold 33, thereby preventing direct impingement of the exhaust gases on the walls of the block 24.

Figure 12:
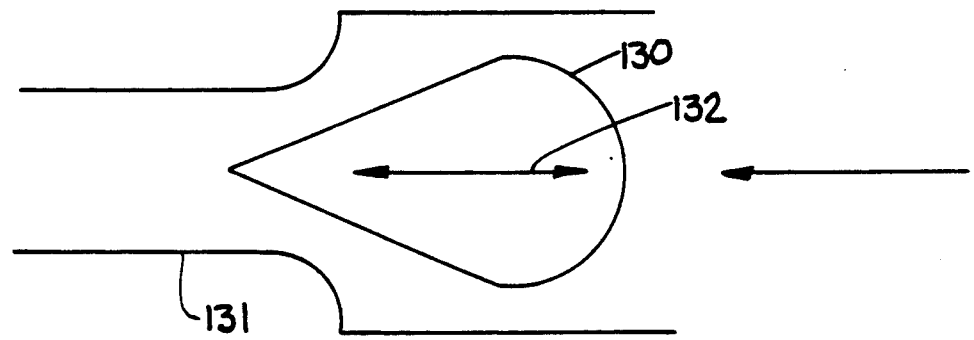
FIG. 12 is a side view of an intake plug for use with the intake system of the engine of FIGS. 1 & 2.
Figure 13:
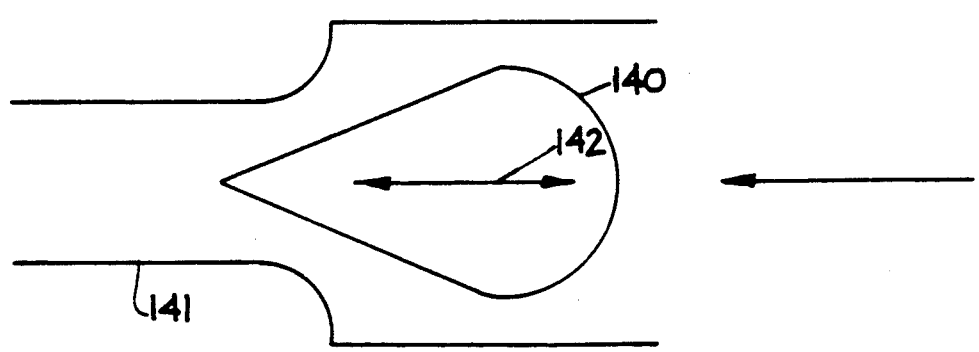
FIG. 13 is a side view of an exhaust plug for use with the exhaust system of the engine of FIGS. 1 & 2.

It is also desirable to control scavenge pressure and flow in the cylinder 22, particularly at low engine speeds. FIG. 12 illustrates a restricting plug 130 provided in an intake restrictor 131 upstream of the intake ports 25. The plug 130 is moved in and out of the intake restrictor 131 along arrow 132 to reduce intake pressure and total intake mass flow, notwithstanding the fact that a constant displacement scavenging air pump (not shown) may be in use. Restriction of intake flow with plug 130 reduces scavenge pump work load and cylinder pressure. This reduction in initial cylinder pressure can be compensated for by varying the engine compression ratio with the timing actuator 50 described above, thus preserving a high thermal efficiency. Similarly, a restricting plug 140, illustrated in FIG. 13, is moved in the direction of arrow 142 in an exhaust restrictor 141 downstream of exhaust ports 31 to control scavenge pressure and flow. Thus, precise control of total scavenge mass flow and pressure can be maintained, thereby permitting the density of the initial cylinder air charge (and consequent specific power density of the engine) to be varied at will. When coupled with the ability to vary compression ratio and intake port 25 and exhaust port 31 timing with the timing actuator 50, the engine's high thermal efficiency can be maintained at widely varying conditions of speed, power, boost air pressure and exhaust back pressure.

Figure 14:
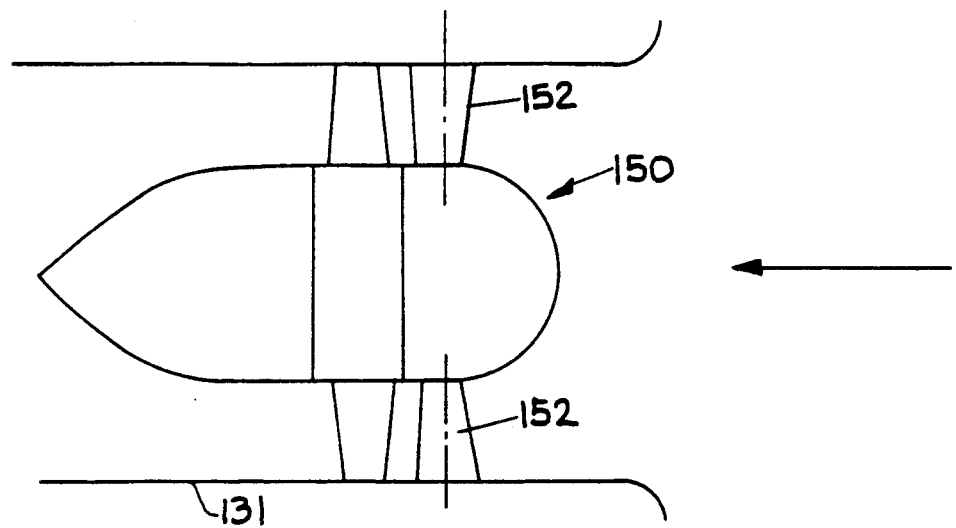
FIG. 14 is a side view of a variable intake turbine for use with the intake system of the engine of FIGS. 1 & 2.
Figure 15:
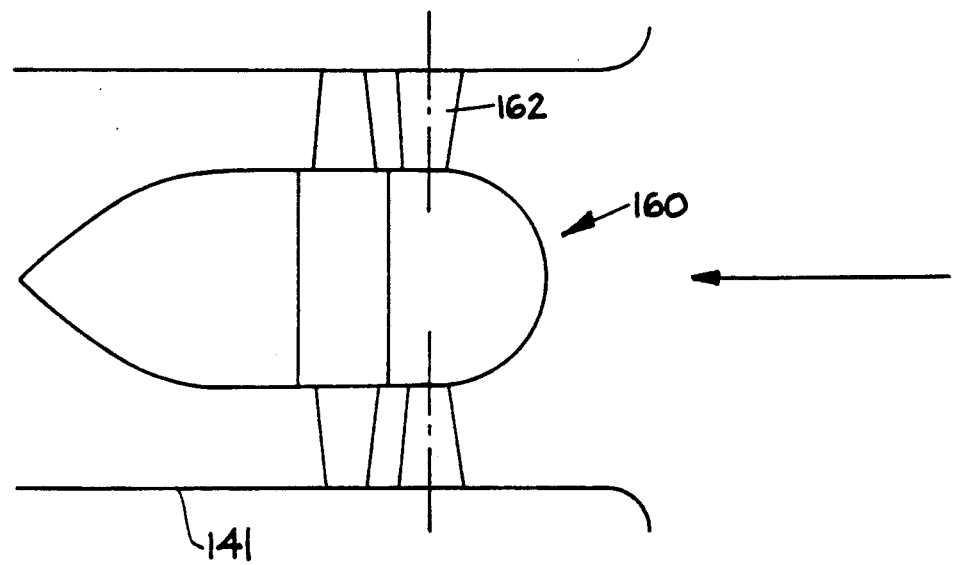
FIG. 15 is a side view of a variable exhaust turbine for use with the exhaust system of the engine of FIGS. 1 & 2.

Another preferred method of controlling scavenge pressure is illustrated in FIG. 14. An air turbine 150 is mounted in the intake restrictor 131 upstream of the intake ports 25. Variable inlet vanes 152 are opened and closed, changing the total pressure drop across the turbine 150 to obtain the desired intake flow rate and pressure. As illustrated in FIG. 15, a gas turbine 160 having variable vanes 162 can also be mounted in an exhaust restrictor downstream of exhaust ports 31 to control scavenge back pressure and flow. Advantages of turbines 150 and 160 include additional work that can be obtained from excess pressure available in the intake air and exhaust gas streams.

Figure 15A:
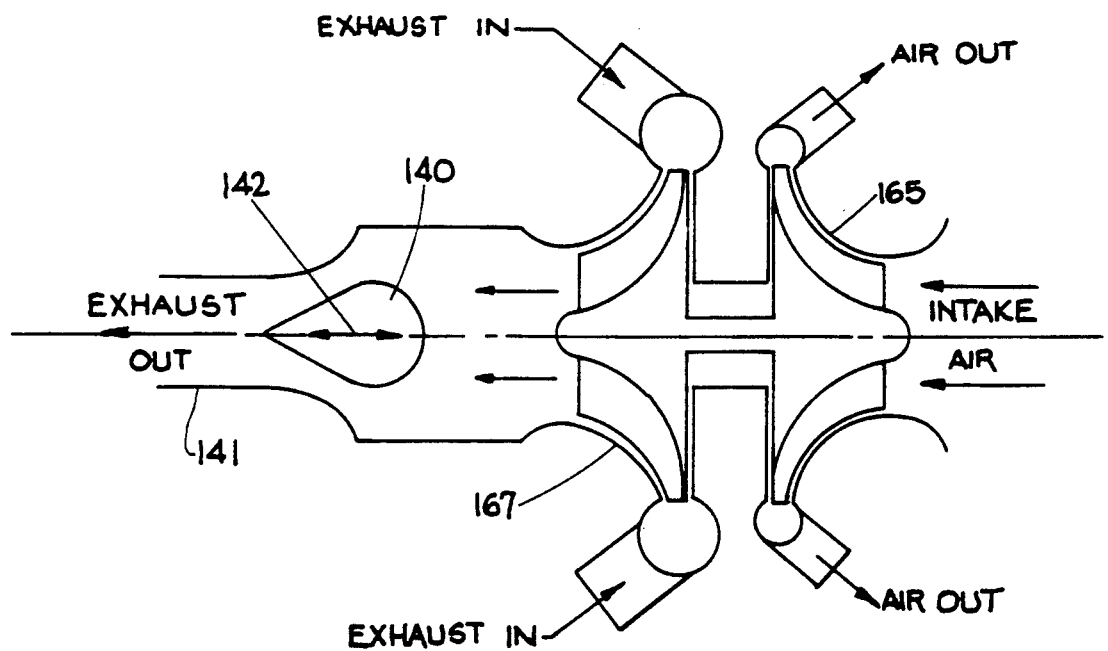
FIG. 15A is a diagrammatic side view of a variable exhaust back pressure control for controlling corrected gas flow through the exhaust turbine.

More specifically, a variable exhaust back pressure control for engine 20 can be utilized when an intake air compressor 165 is driven by a fixed nozzle area exhaust gas turbine in a turbocharger design, as shown in FIG. 15A. Although a centrifugal compressor and a radial inflow turbine are indicated in FIG. 15A, it is understood by those skilled in the art that other compressor and turbine configurations may be utilized as well. In this embodiment, exhaust restricting plug 140 is moved in exhaust restrictor 141 to vary the exhaust back pressure such that the corrected gas flow through turbine 167 is varied by the changes in pressure. By altering the corrected gas flow, pressure drop across turbine 167 is controlled, thereby controlling the turbine work. In contrast to conventional turbocharger control, wherein a wastegate causes part of the exhaust gas to be bypassed around the turbine to change the corrected gas flow through the turbine, all the exhaust gas passes through turbine 167 and all the potential exhaust gas work is available to drive intake air compressor 165.

Use of this improved turbocharger control system permits control of the turbine and compressor operating points, allowing both components to be driven toward their respective optimum operating points simultaneously. This is due to the variable back pressure feature allowing intake air compressor 165 to be matched to a more favorable operating point and holding it there while the turbine corrected flow parameter is simultaneously adjusted to provide the power needed to drive intake air compressor 165 to that point.

This embodiment also permits a wide range of stable engine purge air flow levels and intake pressures, rather than the limited operating points available with a wastegate control. Therefore, exhaust gas flow rates and temperature can be controlled to a much wider extent since all the potential exhaust gas power can be utilized. Consequently, more of the exhaust work can be usefully injected back into the engine's cycle, resulting in more efficient engine operation than with a wastegate-controlled turbocharger. This is especially important at partial engine power where conventional fixed area turbochargers are badly mismatched with nozzles having too great an area for the available exhaust gas flow.

A further advantage of this embodiment is a higher level of intake supercharge pressure and consequent intake air densification, which allows greater horsepower to be obtained from the engine at any given engine rotational speed. Since engine parasitic horsepower losses are largely dependent on engine rotational speeds, this results in higher thermal and mechanical efficiencies for a given horsepower output.

Figure 16:
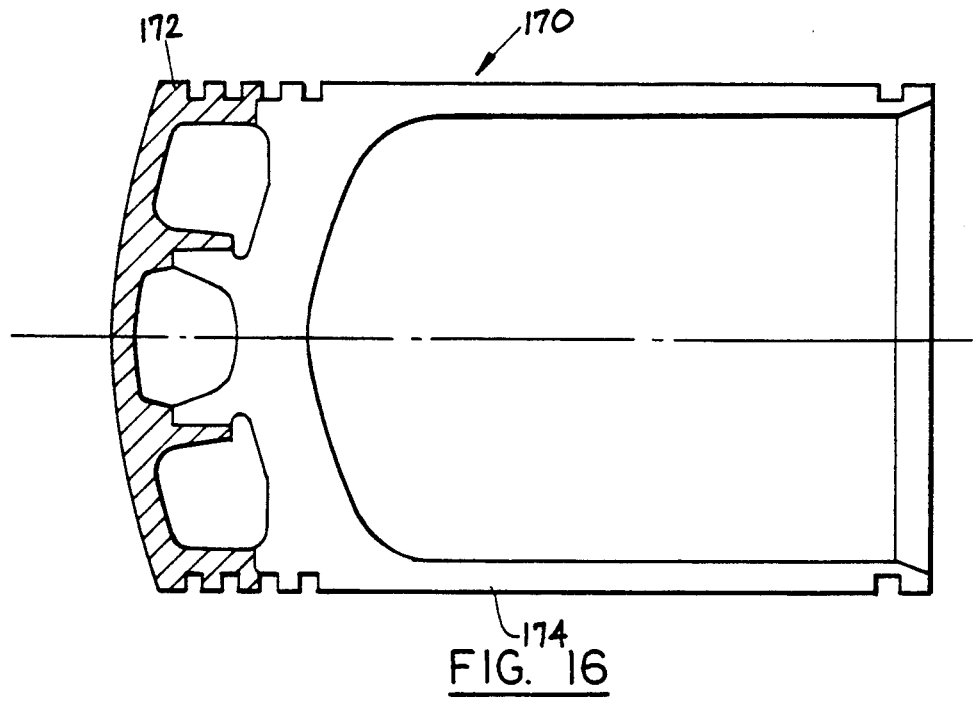
FIG. 16 is a sectional view of a hybrid piston for use with the engine of FIGS. 1 & 2.

It is also preferred that a hybrid piston 170 as illustrated in FIG. 16 be utilized in the engine 20. The hybrid piston 170 includes an end cap 172 of high-temperature metal threaded to a base 174, preferably constructed from aluminum or another lightweight metal. It is preferred that the end cap 172 be threaded to the base. Such threading eliminates the need for separate fasteners found in conventional hybrid pistons.

Figure 17:
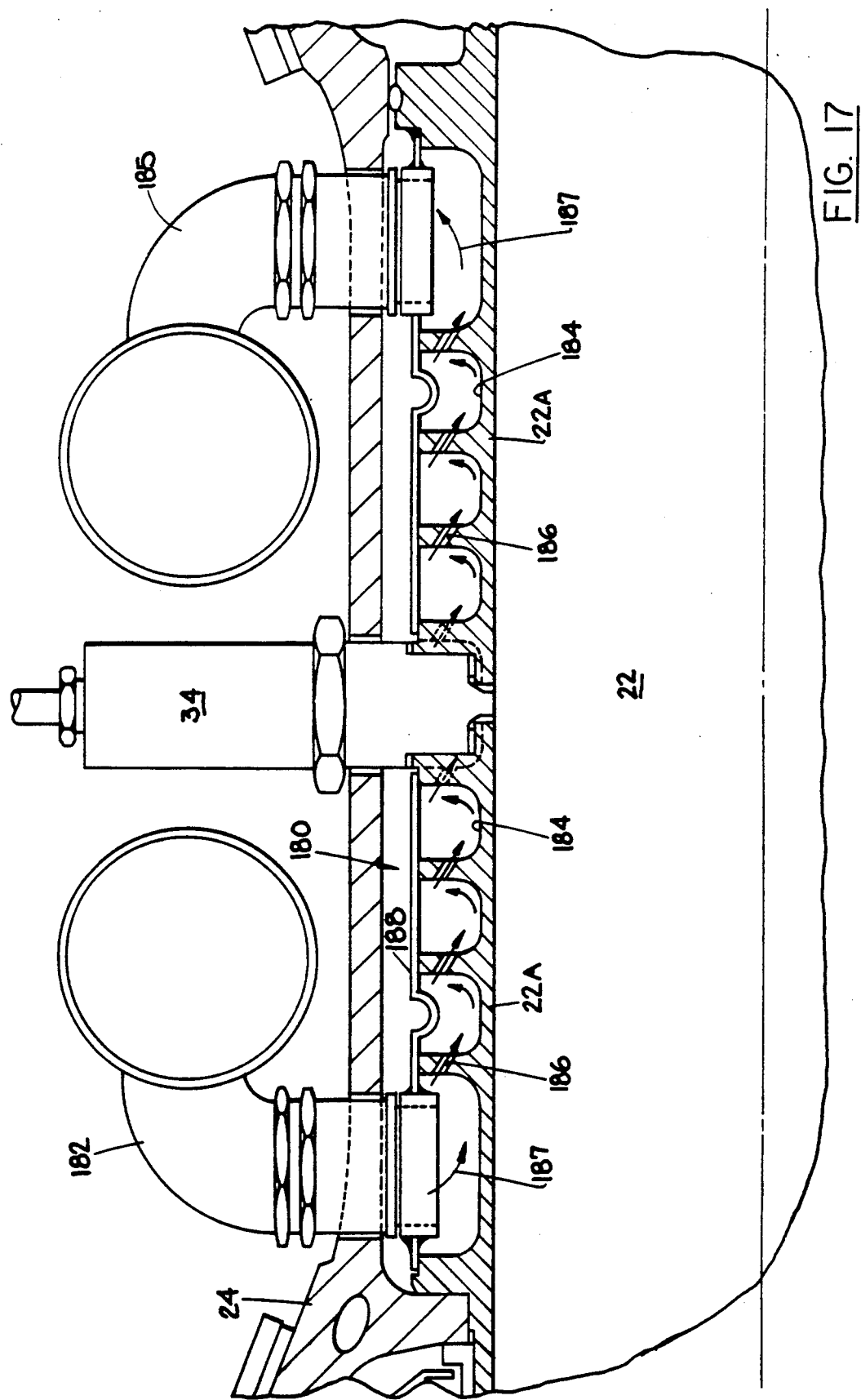
FIG. 17 is an enlarged sectional view of an impingement jet cooling water jacket for use with the engine of FIGS. 1 & 2, and FIG. 18A, 18B and 18C are a graphical representation of the variation in overlap of intake and exhaust port openings with speed that occurs in an engine of the present invention.

A water jacket 180, illustrated in FIG. 17, lowers the temperature of the cylinder 22A by use of a conventional process known as impingement cooling. Coolant is circulated from an inlet 182 through a plurality of cavities 184 to an outlet 185. Each cavity 184 is adjacent to and surrounds the outer surface of the wall 22A. Coolant flows from one cavity 184 to the next under pressure through a series of directional ducts 186 which direct entering fluid to the innermost wall of a cavity 184. Multiple ducts 186 are provided between each cavity 184. As coolant, represented by arrows 187, swirls in each cavity 184, the cooling process is enhanced and the existing thermal boundary layer in the coolant is broken down. This process is conventially known as impingement cooling. A liner 188 constructed from a suitable sealing material seals each cavity 184 from the outside and from the adjacent cavity 184 and prevents leakage of coolant. The process of impingement cooling is several times more effective than comparable convection cooling. Each wall of the cavity 184 is also cooled by the passing of coolant through the ducts 186.

The change in the relative phase angle between crankshafts 36 and 40, caused by any of the actuators 50, 70, 90, or 100 of FIGS. 3-9, results in a variation in the headspace between the pistons 28 and 32 and a variation in the relative location of pistons 28 and 32 with respect to each other. The change in headspace varies the effective compression ratio of the engine 20.

Figures 18A, 18B, 18C:
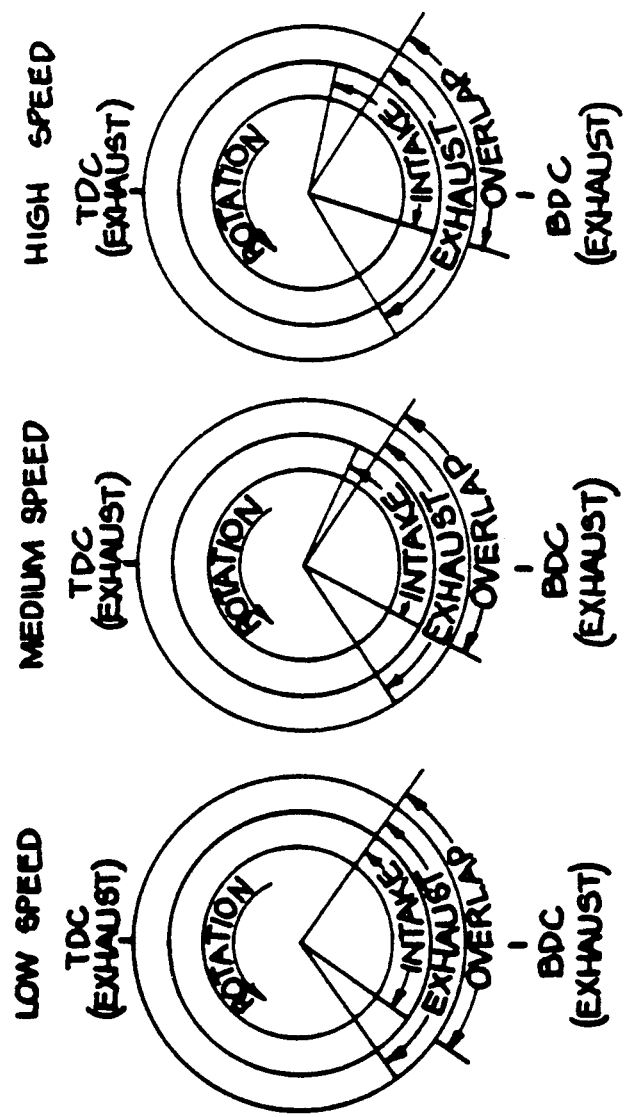

The change in the relative phase angle between crankshafts 36 and 40 also varies the opening duration of the intake and exhaust ports 25 and 31 and their relationship. Therefore, as illustrated in FIGS. 18A, 18B, 18C the amount and duration of the scavenging cycle can also be adjusted at various engine speeds. At low speed, scavenging duration is reduced, thus reducing scavenging flow and parasitic scavenge work. At high speed and power, scavenging duration is increased and the lead of the exhaust port 31 opening before the intake port 25 is increased, thereby permitting a longer relative exhaust period before the intake port 25 opens. This permits the required additional scavenging time for such operation. The change in scavenging duration increases the engine efficiency, especially at lower speeds. This effect is due to the change in relative location of the intake piston 28 to the exhaust piston 32 as they pass over their respective ports.

The present invention has been described above for use with a two-stroke, opposed piston dual crankshaft engine. However, the timing actuator 50 can be applied to any two- or four-stroke internal combustion reciprocating engine. Furthermore, the control of intake/exhaust flow and pressure, the intake swirler 112, the exhaust muff 120, the hybrid piston 170 and the impingement cooling jacket 180 can be adapted for use with other engines.

The present engine 20 offers several advantages over conventional internal combustion engines. The timing actuator 50 permits selective variation in the headspace between pistons 28 and 30. This variation changes the timing of the closing and opening of the intake ports 25 and exhaust ports 31, thereby enhancing or restricting scavenging of the cylinder chamber 22 and controlling the air flow through the engine 20. The variation in port 25 and 31 timing can be coordinated with the compression ratio to enhance engine 20 efficiency. Furthermore, compression ratio and port 25 and 31 timing can be synchronized with air intake, pressure and flow to accommodate engine power requirements and design load limits while reducing parasitic scavenge power losses.

Adjustments can be made in the compression ratio to permit the use of various fuels. Injection or carburetion means can be utilized to insert fuel to the cylinder chamber 22A. If desired, a spark apparatus can be utilized with the present engine 20 by adjusting the compression ratio to an appropriate value for a combustible fuel and spark ignition operation.

Variation of the phase relationship between crankshafts 36 and 40 can reduce or eliminate compression between pistons 28 and 32 to reduce starting power requirements. The phase relationship between a referenced crankshaft such as 36 and the timing of a fuel pump injector 34 can be selectively varied by a timing mechanism to maintain the proper relationship between the instant of fuel injection and the closest approach of pistons 23 and 32.

Although the present invention has been described with reference to preferred embodiments, workers skilled in the art will recognize that changes may be made in form and detail without departing from the spirit and scope of the invention.

What is claimed is:

1. A variable cycle internal combustion engine having a pair of opposed, spaced-apart reciprocating pistons mounted in a cylinder, each piston connected to a respective crankshaft, comprising:
    (a) a gear train mated with the crankshafts, for synchronizing the relative angular relationship between the crankshafts, said gear train including a plurality of gear member; and
    (b) timing actuator means connected to said gear train for selectively and continually adjusting the angular relationship between the crankshafts, said timing actuator means including
        (i) splines carried by one end of one of said crankshafts, said splines having a first spline pitch;
        (ii) internal splines formed through the center of a first gear member, said splines having a second spline pitch, said second spline pitch being different from said first spline pitch;
        (iii) a gear insert, said gear insert including internal splines which slidably and complimentarily engage said splines of said of one said crankshafts, said gear insert including external splines which slidably and complimentarily engage said internal splines of said first gear member;
        (iv) an inner yoke connected to said gear insert;
        (v) an outer yoke connected to said inner yoke by a bearing; and
        (vi) means for linearly actuating said outer yoke parallel to the axis of said one of said crankshafts, whereby the differential between the spline pitch of said gear member and the spline pitch of said one of said crankshafts produces an angular phase change between said crankshafts.

2. A variable cycle internal combustion engine having a pair of opposed, spaced-apart reciprocating pistons mounted in a cylinder, each piston connected to a respective crankshaft, comprising:
    (a) a gear train mated with said crankshafts for synchronizing the relative angular relationship between said crankshafts, said gear train including a plurality of gear members, said gear train including a first transfer shaft extending from a first gear member of said gear train and a second transfer shaft extending from a second gear member of said gear train, said first transfer shaft and said second transfer shaft being disposed colinear with each other, said first transfer shaft terminating in a splined portion of a first spline pitch, said second transfer shaft terminating in a splined portion of a second spline pitch, said first and second spline pitches being different; and
    (b) means for selectively and continually adjusting the angular relationship between said crankshafts, said means including a shifter having a first splined portion which complimentarily engages said splined portion of said first transfer shaft, said shifter having a second splined portion which complimentarily engages said splined portion of said second transfer shaft, whereby linear movement of said shifter parallel to the axes of said first and second transfer shafts produces an angular phase change between said crankshafts.

* * * * *